(12) United States Patent
Yamaguchi et al.

(10) Patent No.: US 6,634,649 B1
(45) Date of Patent: Oct. 21, 2003

(54) GASKET, METHOD OF MOLDING SAME, AND CYLINDRICAL ALKALINE-MANGANESE DIOXIDE CELL USING SAME

(75) Inventors: Norishige Yamaguchi, Fukushima (JP); Hiroyuki Morita, Fukushima (JP); Hideaki Tokugawa, Fukushima (JP); Kazuhiro Hashimoto, Fukushima (JP); Akihiro Sugawara, Fukushima (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 09/328,467

(22) Filed: Jun. 9, 1999

(30) Foreign Application Priority Data

Jun. 15, 1998 (JP) ............................. 10-167548

(51) Int. Cl.$^7$ ................................................ H01M 2/08
(52) U.S. Cl. ...................... 277/634; 277/650; 277/924; 429/35; 429/185
(58) Field of Search ................. 277/634, 641, 277/644, 650, 924; 429/35, 171, 175, 181, 185

(56) References Cited

U.S. PATENT DOCUMENTS

| | | | | |
|---|---|---|---|---|
| 4,092,896 A | * | 6/1978 | Puchy | .......................... 85/50 R |
| 4,774,155 A | * | 9/1988 | Nientiedt et al. | .............. 429/56 |
| 5,227,261 A | * | 7/1993 | Georgopoulos | .............. 429/56 |
| 5,340,666 A | * | 8/1994 | Tomantschger et al. | ...... 429/59 |
| 5,545,365 A | * | 8/1996 | Asai | .......................... 264/328.7 |
| 5,607,796 A | * | 3/1997 | Jacus et al. | .................. 429/165 |
| 5,621,989 A | * | 4/1997 | Hensel et al. | ................. 38/77.8 |
| 5,672,443 A | * | 9/1997 | Salisbury et al. | ............ 429/185 |
| 5,728,343 A | * | 3/1998 | Ueno | .......................... 264/275 |
| 5,728,484 A | * | 3/1998 | Yamaguchi et al. | ........... 429/35 |
| 5,750,283 A | * | 5/1998 | DePalma et al. | .............. 429/56 |
| 6,010,802 A | * | 1/2000 | Passaniti et al. | ............. 429/172 |

FOREIGN PATENT DOCUMENTS

| | | |
|---|---|---|
| EP | 0 785 585 A1 | 7/1997 |
| EP | 0 840 383 A1 | 3/1998 |
| JP | 64 000642 A | 1/1989 |
| JP | 09 007572 A | 1/1997 |

* cited by examiner

Primary Examiner—Anthony Knight
Assistant Examiner—Alison K. Pickard
(74) Attorney, Agent, or Firm—Bell, Boyd & Lloyd LLC

(57) ABSTRACT

A gasket for use in a cylindrical alkaline-manganese dioxide cell is molded by injecting a molten resin into a mold assembly having a male mold having an injection gate formed in a cylindrical space and a projection formed in a narrow space and of which a side facing the cylindrical space is chamfered or curved, and a female mold having at least any one of an eject sleeve or ejection pin. The gasket is used to seal an opening of a can of the cylindrical alkaline-manganese dioxide cell. In the gasket, the boundary between a thin portion and hob portion thereof is chamfered or curved and the boundary between the thin and diaphragm portions is formed like a generally vertical edge.

10 Claims, 8 Drawing Sheets

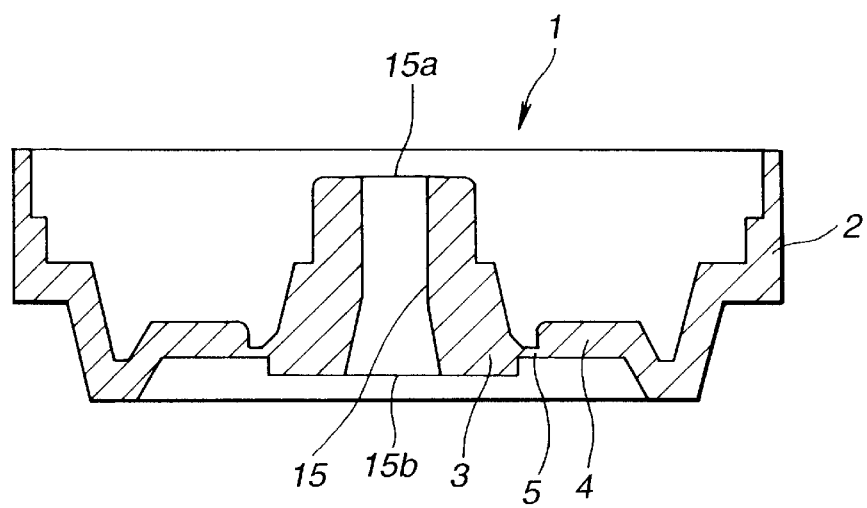
FIG.10
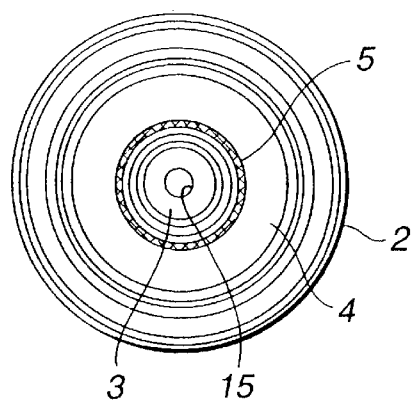 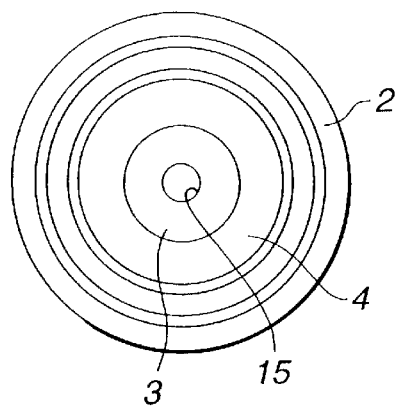
FIG.11A FIG.11B

GASKET, METHOD OF MOLDING SAME, AND CYLINDRICAL ALKALINE-MANGANESE DIOXIDE CELL USING SAME

RELATED APPLICATION DATA

The present application claims priority to Japanese Application No. P10-167548 filed Jun. 15, 1998, which application is incorporated herein by reference to the extent permitted by law.

BACKGROUND OF THE INVENTION

1. Field of the Invention

The present invention relates to a cracking-resistant gasket having a function to stably prevent an explosion, a method of molding the gasket, and a cylindrical alkaline-manganese dioxide cell incorporating the gasket to provide an excellent leakage-proof structure.

2. Description of Related Art

If a cylindrical alkaline-manganese dioxide cell is overcharged or over-discharge due to an incorrect use, gases are generated furiously inside the container or can of the cell to elevate the internal pressure, possibly resulting in a leakage of the electrolyte, etc. and in an explosion in some cases. To avoid this, the cylindrical alkaline-manganese dioxide cell is provided with an explosion-proof mechanism to quickly purge gases having been generated inside the cell and elevated the internal pressure.

Generally, the above-mentioned explosion-proof mechanism adopted in the conventional alkaline-manganese dioxide cells is a thinned portion of a gasket sealing the opening of the cell can and which acts as an explosion-proof safety valve. More specifically, a stress caused by an internal pressure elevated by gases generated inside the cylindrical alkaline-manganese dioxide cell is concentrated to the gasket whose thinnest portion will be torn. The gases generated inside the cell are purged to outside through an opening thus formed in the gasket, thereby preventing the cell from exploding due to an elevated internal pressure inside the cell.

There have so far been proposed various types of conventional gaskets formed in various shapes, by molding, from a synthetic rein such as Nylon, polypropylene, etc. or a rubber as shown in FIGS. 1 to 4.

FIG. 1 illustrates a first example of conventional gasket in the form of an axial sectional view. The gasket is generally indicated with a reference numeral 50. It consists of a thick-walled cylindrical portion 51 formed at the center thereof and having a convex axial-section (will be referred to as "hob portion" hereinunder), a disc-like portion 52 formed along the outer circumference of the hob portion 51 and concentrically with he hob portion 51 (will be referred to as "diaphragm portion" hereinunder), thin portions 53 formed between the hob and diaphragm portions 51 and 52 and in a position nearer to the upper side of the diaphragm portion 52, and a peripheral portion 54 formed contiguously along the outer circumference of the diaphragm portion 52 to have the axial-sectional shape of a curve. The hob portion 51 is a cylinder having a hob hole 55 open at the top thereof as indicated with a reference numeral 55a and at the bottom thereof as indicated with a reference numeral 55b and whose inside diameter is gradually increased downward so that the lower opening 55b of the hob hole 55 is larger than the upper opening 55a. The thin portions 53 are two arcs each formed concentrically with the hob portion 51 as shown in FIG. 5.

FIG. 2 shows a second example of conventional gasket in the form of an axial sectional view. This gasket is generally indicated with a reference numeral 60. It consists of a hob portion 61, diaphragm portion 62, thin portions 63 and a peripheral portion 64 as in the gasket 50 having been described above. In this example, the hob portion 61 is a cylinder having a hob hole 65 whose lower portion is larger in diameter than the upper portion. That is to say, the wall of the hob hole 65 is stepped at the boundary between the upper and lower portions. As shown in FIG. 5, the thin portions 63 are two arcs concentric with the hob portion 61 similarly to the thin portions 53 of the gasket 50.

FIG. 3 is an axial sectional view of a third example of conventional gasket. The gasket is generally indicated with a reference numeral 70. The gasket 70 consists of a hob portion 71 formed to have a convex section, a diaphragm portion 72 formed concentrically with the hob portion 71 and obliquely towards the upper end portion of the hob portion 71, thin portion 73 formed between the hob portion 71 and diaphragm portion 72 in a position nearer to the upper side of the diaphragm portion 72, and a peripheral portion 74 formed contiguously along the outer circumference of the diaphragm portion 72 to have the axial-sectional shape of a curve. The hob portion 71 is formed longer than those 51 and 61 of the gaskets 50 and 60, respectively, to project downward from the bottom surface of the diaphragm portion 72. The hob portion 71 is a cylinder having a straight bob bole 75 having a same diameter everywhere through it. The thin portion 73 takes the form of a circle formed concentrically with the hob portion 71 as shown in FIG. 6.

FIG. 4 shows a fourth example of conventional gasket in the form of an axial sectional view. The gasket is generally indicated with a reference numeral 80. The gasket 80 includes a hob portion 81, a diaphragm portion 82 formed concentrically with the bob portion 81, a thin portion 83 formed in a portion of the diaphragm portion 82, and a peripheral portion 84 formed contiguously along the outer circumference of the diaphragm portion 82. The bob portion 81 consists of upper and lower halves projecting upward and downward, respectively, to a generally same extent from the diaphragm portion 82a. The bob portion 81 is a cylinder having formed therein a straight bob hole 85 open at the top thereof as indicated with a reference numeral 85a and at the bottom thereof as indicated with a reference numeral 85b and having a same diameter everywhere through it. The thin portion 83 is formed to extend in a round hole in a portion of the diaphragm portion 82 as shown in FIG. 7.

The aforementioned gaskets 50, 60, 70 and 80 (will be generically called "gasket 50" hereinunder) are formed by an injection molding in which a molten resin is injected from an injection gate into a space defined between male and female molds. FIG. 8 is an axial sectional view of a first example of mold assembly for molding the conventional gaskets. The mold assembly is generally indicated with a reference numeral 90. Referring to FIG. 8, how to mold the gasket using the mold assembly 90 will be described herebelow. The mold assembly 90 is a combination of a male mold 90a and a female mold 90b. When set in place, the male and female molds 90a and 90b define together a cylindrical space 91 for the hob portion, a flat space 92 for the diaphragm portion, a curved space 93 for the peripheral portion, and a narrower space 94 contiguous to the inner end of the flat space 92 to form the thin portion 94. The female mold 90b has a pin point gate 96 formed therein in the proximity of the base of a core pin 95. The pin point gate 96 is open at the bottom of the cylindrical space 91. The gasket 50 is molded by injecting a molten resin into the mold assembly 90.

FIG. 9 shows, in the form of an axial sectional view, a second example of mold assembly used for molding the conventional gaskets. The mold assembly is generally indicated with a reference numeral 100. The mold assembly 100 is a combination of a male mold 100a and a female mold 100b. Different from the mold assembly 90 shown in FIG. 8, the mold assembly 100 is of a gate type for molding the gasket 50. As in the gate 90, the gate 100 has a cylindrical space 101, a flat space 102, a curved space 103, and a narrower space 104. By injecting a molten resin into the mold assembly 100 from a side gate 105 open at the end of the curved space 103, the gasket 50 is molded.

The gate 50 can be formed using any one of various mold assemblies having so far been proposed and which are provided with a film gate or disc gate formed to extend from the bottom of the cylindrical space for the hob portion, a single- or multi-point pin gate formed to extend from the flat space for the diaphragm portion, and a submarine gate formed to extend from the curved space for the peripheral portion.

For use in the cylindrical alkaline-manganese dioxide cells, there have been proposed the gaskets molded to have various shapes as mentioned above, and also various mold assemblies destined for such gasket shapes and various gates formed in the mold assemblies have been proposed.

However, if a mold design and gate formed in the mold are not suitable for a gasket to be produced by an injection molding, the molten resin will not flow in a desired direction and air in the mold assembly will not sufficiently be purged. In this case, the molten resin will not evenly be filled into the mold assembly and the gasket will be molded from the insufficient amount of the molten resin thus filled. In the resulting gasket, void, sink or weld mark will occur at the hob portion to weaken the gasket, the thin portion will incur a weld mark, and thus the gasket will have no uniform distribution of strength.

In a gasket thus molded with such defects, a shock given when a current collector is inserted into the hob portion, a stress developed in the hob portion after the current collector has been inserted, a long-term storage at room temperature or storage at undesirable temperatures, will cause the hob portion to easily crack. If such a crack takes place at the hob portion, the sealing between the hob portion and current collector will be broken and thus an electrolyte in the cell will move between the hob portion and current collector until it leaks from the cell. Also, such a cracking of the hob portion will not lead to a uniform, stable tearing of the thin portion which acts as an explosion safety valve.

In the cylindrical alkaline-manganese dioxide cells, the cracking of the gasket hob portion and nonuniform tearing of the thin portion is a great cause of the electrolyte leakage from the cell.

Further, it has been a great technical difficulty to mold a gasket incurring no void, sink or weld mark at the hob portion, no weld mark at the thin portion and no nonuniform distribution of strength and which can thus keep the cell against leakage of electrolyte.

SUMMARY OF THE INVENTION

Accordingly, the present invention has an object to overcome the above-mentioned drawbacks of the prior art by providing a gasket excellent in cracking resistance and tearable uniformly and stably to serve as an explosion safety valve, a method of molding the gasket, and a cylindrical alkaline-manganese dioxide cell using the gasket and in which electrolyte leakage can effectively be prevented According to the present invention, there is provided a gasket including a cylindrical portion whose lower portion is gradually increased in thickness towards the lower end thereof, having formed therein a hole open at the top and bottom thereof, the lower opening being larger than the upper one, and in which a current collector is to be inserted; a disc-shaped portion formed contiguously along the outer circumference of and concentrically with the cylindrical portion; a thin portion formed between the cylindrical and disc-like portions, concentrically with the cylindrical portion and in a position nearer to the lower side of the disc-shaped portion; and a peripheral portion formed contiguously along the outer circumference of the disc-shaped portion to have the axial-sectional shape of a curve; the cylindrical portion being formed to project at the lower end thereof downward from the bottom of the disc-shaped portion; the boundary between the cylindrical and thin portions being chamfered or curved; and the boundary between the disc-shaped and thin portions being formed like a generally vertical edge.

According to the present invention, there is provided a method of molding a gasket using a mold assembly consisting of a male mold and female mold which will define together, when being assembled to each other, spaces into which a resin is filled to mold the gasket, the spaces including a cylindrical space; a flat space positioned along the outer circumference of the cylindrical space; a curved space contiguous to the outer circumference of the flat space; and a narrow space resulted from a projection formed on the male mold between the cylindrical and disc-shaped spaces, the projection being chamfered or curved at a side thereof facing the cylindrical space and directed downward in the direction of the female mold; the male mold having formed therein an injection gate open at the top of the cylindrical space; and at least any one of an ejector sleeve formed on the female mold at the bottom of the cylindrical space and an ejector pin formed in the curved space, being provided for the resin to be filled uniformly into the mold assembly.

According to the present invention, there is provided a cylindrical alkaline-manganese dioxide cell including a can open at one end thereof, the can opening being sealed with a gasket including a cylindrical portion whose lower portion is gradually increased in thickness towards the lower end thereof, having formed therein a hole open at the top and bottom thereof, the lower opening being larger than the upper one, and in which a current collector is to be inserted; a disc-shaped portion formed contiguously along the outer circumference of and concentrically with the cylindrical portion; a thin portion formed between the cylindrical and disc-like portions, concentrically with the cylindrical portion and in a position nearer to the lower side of the disc-shaped portion; and a peripheral portion formed contiguously along the outer circumference of the disc-shaped portion to have the axial-sectional shape of a curve; the cylindrical portion being formed to project at the lower end thereof downward from the bottom of the disc-shaped portion; the boundary between the cylindrical and thin portions being chamfered or curved; and the boundary between the disc-shaped and thin portions being formed like a generally vertical edge.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 10 is an axial sectional view of a gasket according to the present invention;

FIG. 11A is a plan view of the gasket in FIG. 10

FIG. 11B is a bottom view of the gasket in FIG. 10;

DETAILED DESCRIPTION OF THE PREFERRED EMBODIMENTS

Figure 1:
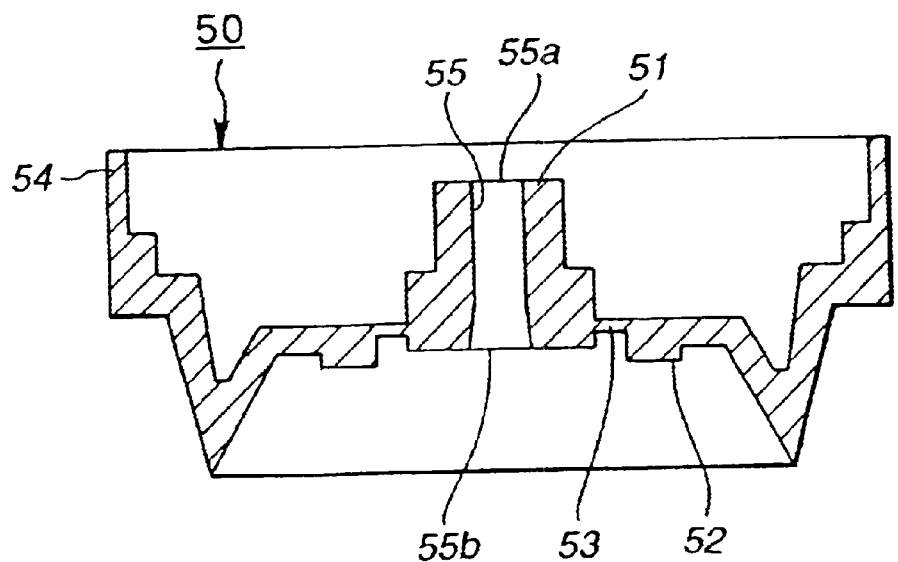
FIG. 1 is an axial sectional view of a first example of conventional gasket.
Figure 2:
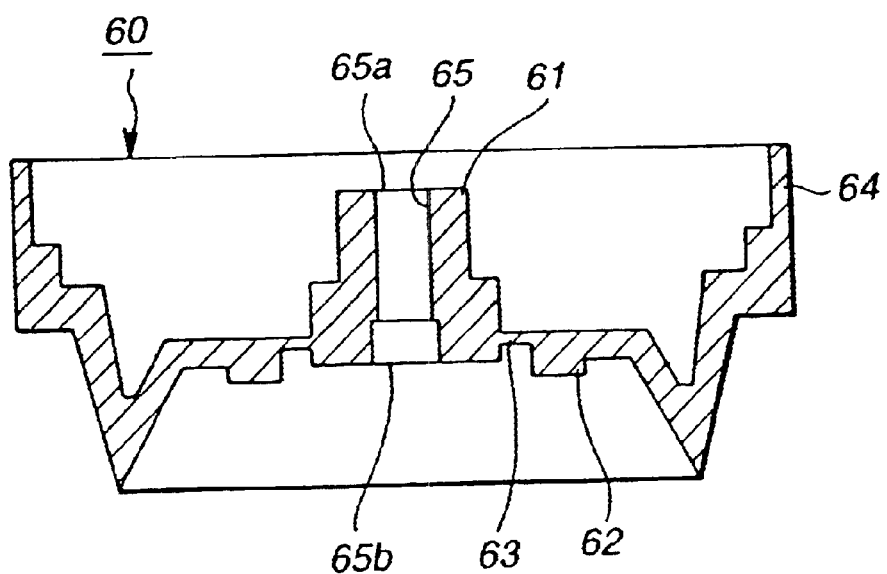
FIG. 2 is an axial sectional view of a second example of conventional gasket.
Figure 3:
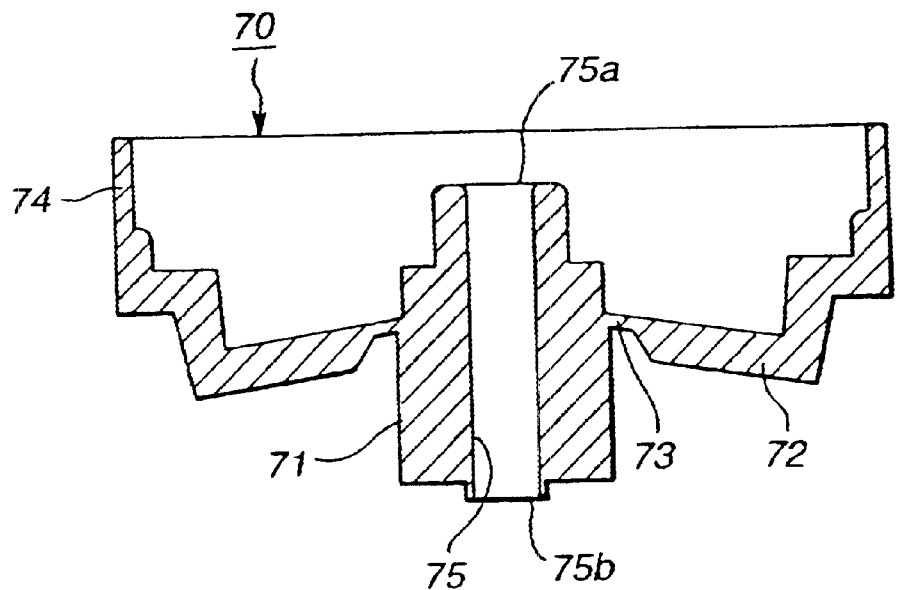
FIG. 3 is an axial sectional view of a third example of conventional gasket.
Figure 4:
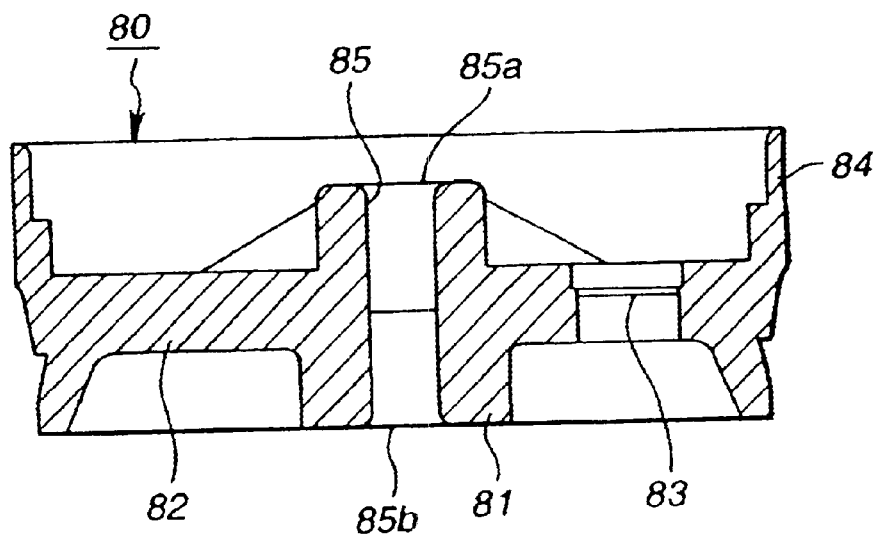
FIG. 4 is an axial sectional view of a fourth example of conventional gasket.
Figure 5:
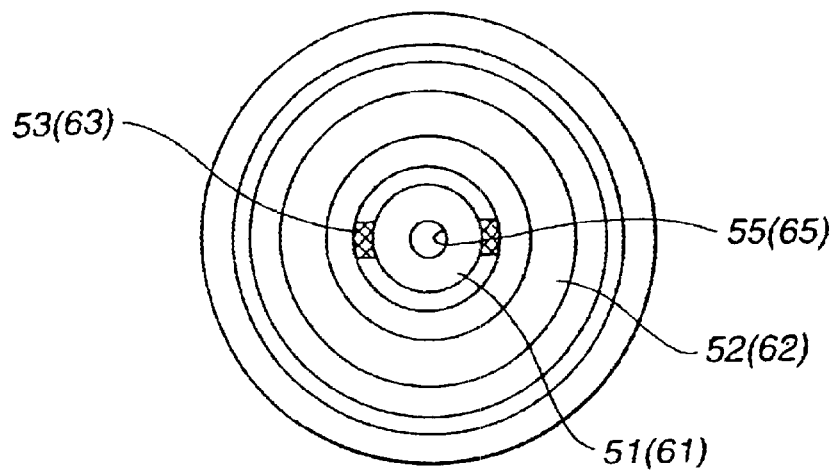
FIG. 5 is a bottom view of the first and second examples of conventional gaskets.
Figure 6:
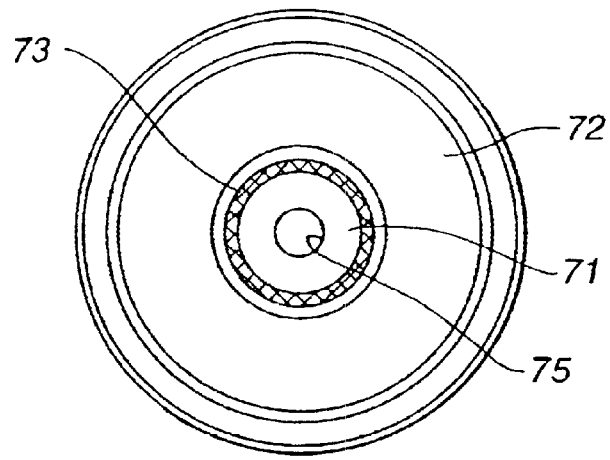
FIG. 6 is a bottom view of the third example of conventional gasket.
Figure 7:
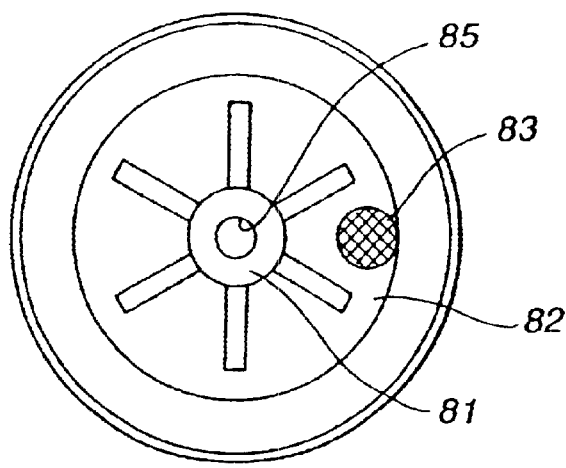
FIG. 7 is a bottom view of the fourth example of conventional gasket.
Figure 8:
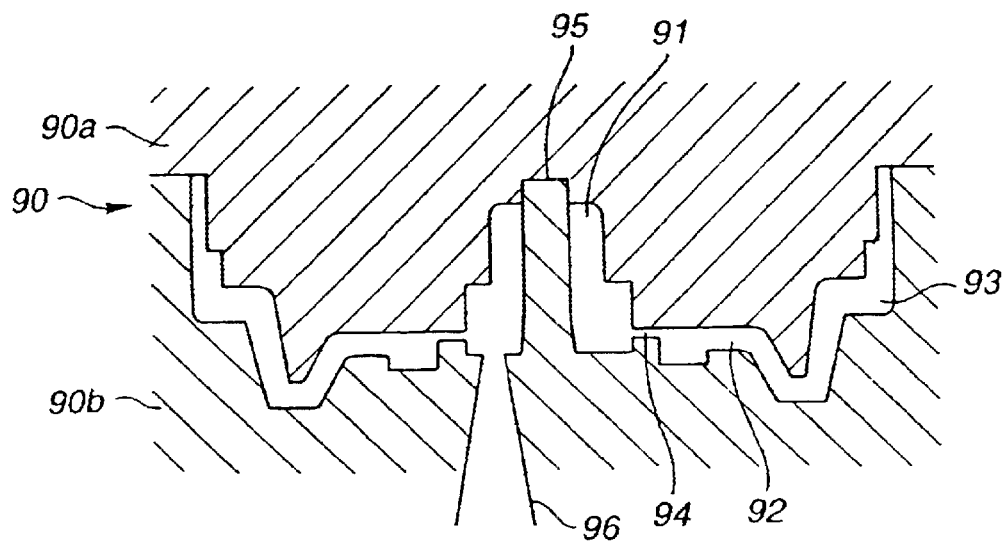
FIG. 8 is an axial sectional view of a first example of mold assembly used for molding the conventional gaskets.
Figure 9:
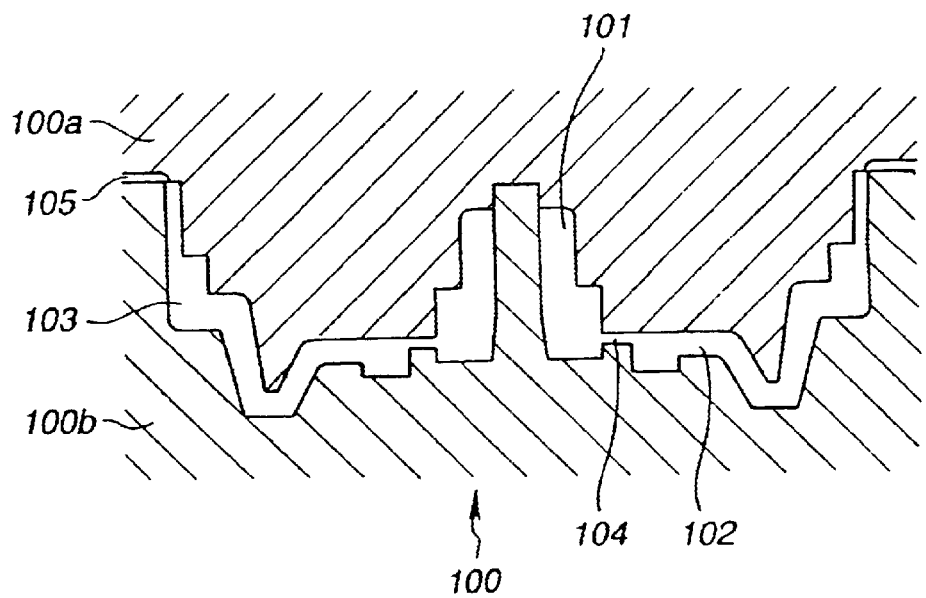
FIG. 9 is an axial sectional view of a second example of mold assembly used for molding the conventional gaskets.

Referring now to FIG. 10, there is illustrated a gasket according to the present invention. The gasket is generally indicated with a reference numeral 1. The gasket 1 consists of a peripheral portion 2 formed along the outer circumference of the gasket 1 to have the axial-sectional shape of a curve, a thick hob portion 3 formed in the center of the gasket 1, a flat diaphragm portion 4 formed between the peripheral and hob portions 2 and 3, and a thin portion 5 formed between the hob and diaphragm portions 3 and 4. The gasket 1 has the above-mentioned portions formed contiguous to each other. As shown in FIGS. 11A and 11B, the portions of the gasket 1 are formed concentrically with each other.

Figure 12:
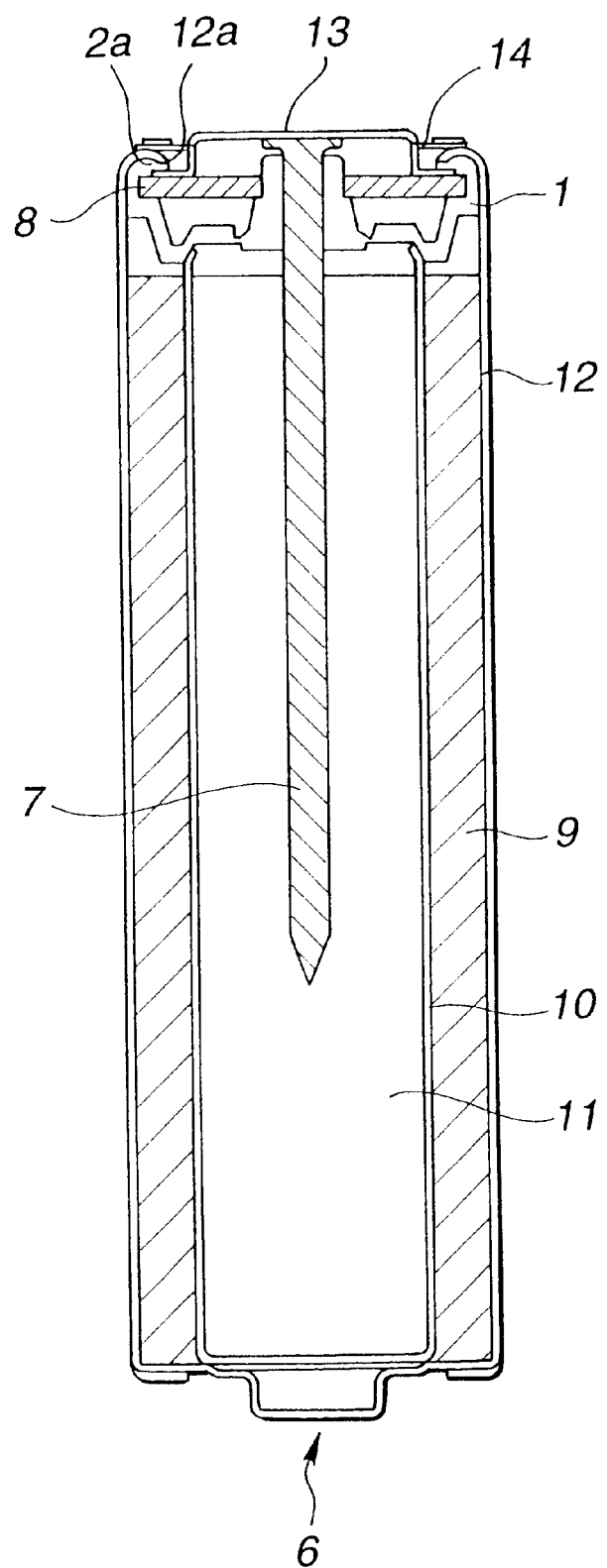
FIG. 12 is an axial sectional view of a cylindrical alkaline-manganese dioxide cell according to the present invention using the gasket shown in FIG. 10.

As shown in FIG. 12, in a cylindrical alkaline-manganese dioxide cell 6, the gasket 1 is used together with a washer 8 with a current collector 7 inserted therein to seal an opening 12a of a cell can 12 in which a cathode mixture 9, separator 10 and an anode gel 11 are provided. In the cylindrical alkaline-manganese dioxide cell 6, the opening 12a sealed with the gasket 1 and washer 8 is further closed with an anode cover 13 and insulation washer 14.

As shown in FIG. 12, with the anode cover 13 installed over the gasket 1 sealing the opening 12a of the can 12, the peripheral portion 2 is caught between the can 12 formed integrally with the cathode and the anode cover 13 to insulate the can 12 and anode cover 13 from each other.

As shown in FIG. 10, the hob portion 3 is formed to be cylindrical and has a hob hole 15 formed in the center thereof. The hob portion 3 is gradually thickened at the lower portion thereof, and the lower portion of the hob hole 15 is also gradually enlarged correspondingly to the flaring of the lower portion. Since the lower portion of the hob portion 3 is gradually increased in thickness and the lower portion of the hob hole 15 is gradually enlarged as it goes downward, when the current collector 7 is introduced from the upper opening 15a into the hob hole 15 in the direction of the lower opening 15b, the shock given by the current collector 7 to the inner wall of the hob hole 15 and the stress given by the inserted current collector 8 to the inner wall of the hob hole 15 are reduced to inhibit a crack from taking place in the hob portion 3. Since the occurrence of a crack in the hob portion 3 is thus prevented, the sealing established by the gasket 1 and current collector 7 will not be damaged, thus it is possible to prevent the electrolyte from leaking from the cylindrical alkaline-manganese dioxide cell 6. In this embodiment, the lower portion of the hob hole 15 is gradually enlarged as it goes downward. However, the present invention is not limited to this embodiment, but the lower portion of the hob hole 15 may not gradually be increased in thickness so long as the lower portion is larger than the upper portion to reduce the shock given to the hob portion 3 by the current collector 7 inserted into the hob hole 15. For example, the inner wall of the hob hole 15 may be stepped.

A lower end portion of the hob portion 3 at which the hob hole 15 opens (at 15b) is formed to project from the bottom of the diaphragm portion 4. Thus, the area of contact between the gasket 1 and current collector 7 can be made large. Namely, the distance over which the electrolyte, etc. in the can 12 moves between the hob portion 3 and current collector 7 is long enough to inhibit the electrolyte from leaking from the cylindrical alkaline-manganese dioxide cell 6.

In the hob portion 3, the hob hole 15 is formed to have a diameter falling in a range of 80 to 90% of the outside diameter of the current collector 7. If the diameter of the hob hole 15 is less than 80% of the outside diameter of the current collector 7, a large shock or stress is given to the hob portion 3 when the current collector 7 is introduced into the hob hole 15, with a result that a crack is likely to take place in the hob portion 3. The crack will damage the sealing established between the hob portion 3 and current collector 7 to cause a leakage of the electrolyte. Also, if the diameter of the hob hole 15 exceeds 90% of the outside diameter of the current collector 7, no close contact is attained between the hob portion 3 and current collector 7 and thus a leakage of the electrolyte moving between the hob portion 3 and current collector 7 cannot be inhibited.

The diaphragm portion 4 is applied with a stress caused to develop when any incorrect use of the cylindrical alkaline-manganese dioxide cell 6 generates gases inside the cell 6 and the gases increase the internal pressure of the cell 6.

When the gases generated inside the cell 6 increase the internal pressure which will give a stress to the diaphragm portion 4, the thin portion 5 is torn to release the gases. Namely, the thin portion 5 serves as an explosion safety valve. The thin portion 5 is formed concentrically with the hob portion 3 between the hob and diaphragm portions 3 and 4 as shown in FIGS. 11A and 11B.

Figure 13A:
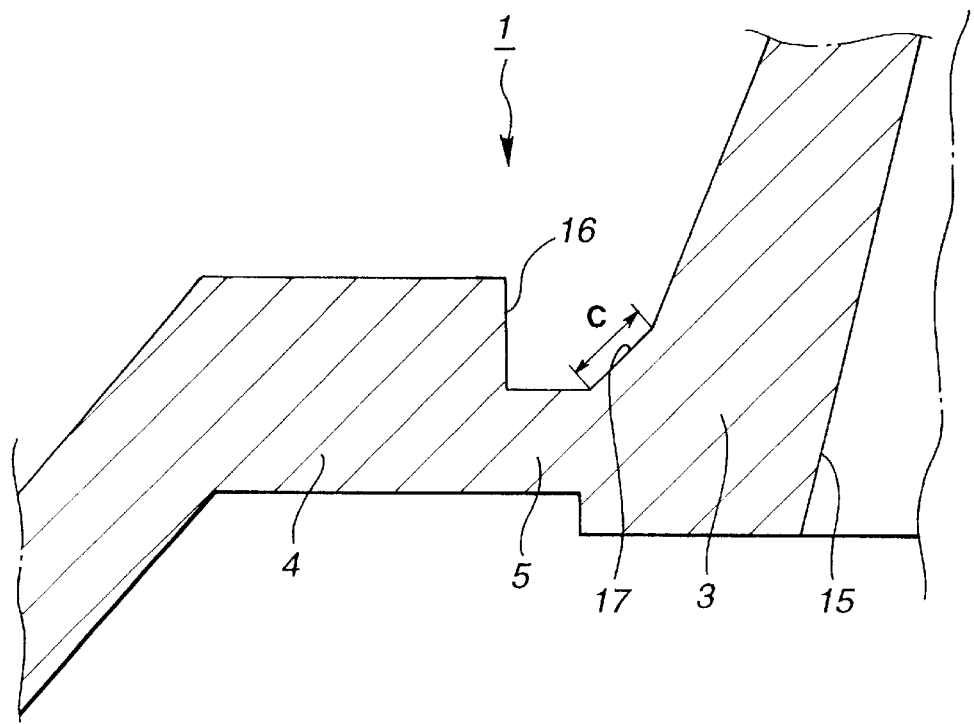
FIG. 13A is a sectional view, enlarged in scale, of an essential portion of the gasket having a chamfered boundary between a bob and thin portion thereof.
Figure 13B:
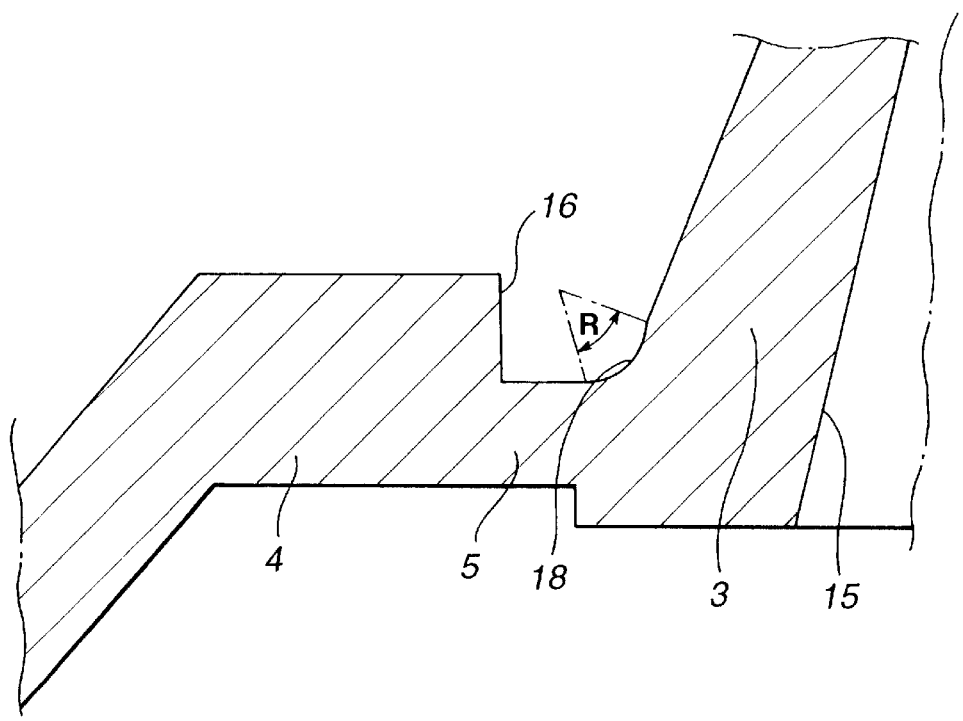
FIG. 13B is a sectional view, enlarged in scale, of an essential portion of the gasket having a curved boundary between a bob and thin portion thereof.

As shown in FIG. 13A, the thin portion 5 is formed in a position nearer to the bottom of the diaphragm portion 4 and has an edge-like vertical surface 16 formed along the outer circumference thereof, namely, along the boundary between the thin and diaphragm portion potions 5 and 4 to be generally vertical, and a chamfered oblique surface 17 formed along the inner circumference thereof, namely, along the boundary between the thin and hob potions 5 and 3. The oblique surface 17 should preferably be chamfered to have a length C of 0.01 to 0.20 mm. The thin portion 5 may be formed to have a curved surface 18 as shown in FIG. 13B, not the oblique surface 17, along the boundary between the thin and hob portions 5 and 3. The curved surface 18 should preferably be formed to have a radius R of curvature ranging from 0.05 to 0.30 mm. Since the thin portion 5 has the oblique surface 17 or curved surface 18 adding to the thickness, and thus strength, of the boundary between the thin and hob portions 5 and 3, when the internal pressure of the cylindrical alkaline-manganese dioxide cell 6 is increased for some reason, the thin portion 5 will be torn in an area nearer to the edge-like vertical surface 16. Namely, the thin portion 5 is thinner and so weaker in the area nearer to the edge-like vertical surface 16 than in an area nearer to the boundary between the thin and diaphragm portions 5 and 4. Thus the thin portion 5 will be torn stably in this predetermined area.

Figure 14:
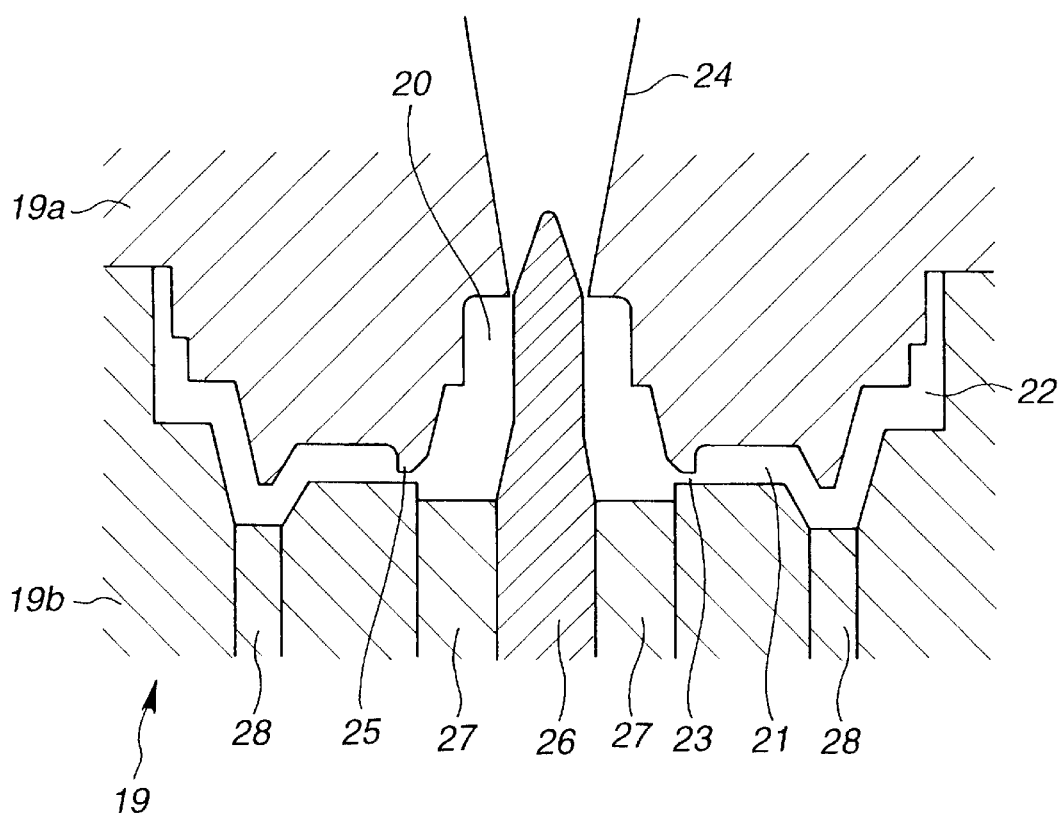
FIG. 14 is an axial sectional view of a mold assembly used for molding the gasket according to the present invention.

The gasket 1 is molded by filling a resin into the mold assembly 19 as shown in FIG. 14. The mold assembly 19 consists of a male mold 19a and a female mold 19a. When these molds 19a and 19b are assembled together, the mold assembly 19 will have a predetermined space defined therein by the molds 19a and 19b. The space comprises a cylindrical space 20 for the hob portion 3, a flat space 21 for the diaphragm portion 4, a curved space 22 for the peripheral portion 2, and a narrow space 23 for the thin portion 5.

The male mold 19a has disposed at the top of the cylindrical space 20 an injection gate 24 through which a molten resin is filled into the mold assembly 19. The molten resin supplied through the injection gate 24 formed at the top of the cylindrical space 20 will flow down from above in a constant direction. Thus the molten resin flows smoothly inside the mold assembly 19, so that less voids, sinks and weld marks or similar defect will take place in the gasket 1 thus molded. Note that the injection gate 24 is a ring gate, disc gate or film gate.

The male mold 19a has further a projection 25 formed to extend towards the female mold 19b in the narrow space 23 for the thin portion 5. The projection 25 is chamfered or curved at the inner-circumferential side thereof or at the side thereof facing the cylindrical portion 20. This chamfering or curving will promote the molten resin to flow smoothly inside the mold assembly 19 from the hob portion 3 towards the peripheral portion 2 of the gasket 1 going to be molded.

The female mold 19b has a core pin 26 formed to penetrate through the center of the cylindrical space 19. Since the core pin 26 corresponds in shape to the hob hole 15 of the hob portion 3, it has a lower portion thereof gradually increased in thickness.

The female mold 19b has an ejector sleeve 27 provided along the outer circumference of the core pin 26, namely, at the bottom of the cylindrical space 20. The female mold 19b has also an ejector pin 28 provided in a position further outer than the ejector sleeve 27 in the curved space 22. When an injection molding is done with the mold assembly 19 thus constructed, air can easily be purged from inside the mold assembly 19 through a clearance between the ejector sleeve 27 and female mold 19b and a one between the ejector pin 28 and female mold 19b. Thus, since air can be purged sufficiently from inside the mold assembly 19 when the gasket 1 is molded, it is possible to prevent voids, sinks or weld marks from taking place on the gasket 1. The ejector sleeve 27 and ejector pin 28 slide at each time of molding and the clearances between the sleeve 27 female mold 19b and between the pin 28 and female mold 19b, respectively, can be maintained to effectively work as air vent.

In this embodiment, the mold assembly 19 is provided with the ejector sleeve 27 and ejector pin 28. However, even only one of them will be able to effectively work as air vent. Therefore, the female mold 19b may be provided at least one of the ejector sleeve 27 and ejector pin 28.

Experimental Embodiments

Cylindrical alkaline-manganese dioxide cell Nos. 1 to 13 were experimentally produced using the gasket according to the present invention, and subjected to various tests. The present invention will further be described herebelow based on the test results. The cylindrical alkaline-manganese dioxide cell Nos. 1 to 13 used a gasket molded by a same method in a same shape as those having been described in the foregoing concerning the embodiment of gasket 1 according to the present invention and were tested in different conditions.

The cell Nos. 1 to 6 were tested for the occurrence of leakage and crack under predetermined conditions of storage. The leakage test was done on the cells having been left at room temperature for periods of one year and two years, respectively, after their production, and having been left at a temperature of 75° C. and humidity of 50% for periods of 40 days, 80 days and 120 days, respectively, after their production. The cells were visually checked for a leakage. Then, the cells showing a leakage as the result of the visual checking were disassembled and the gaskets in them were checked for a crack under a microscope with a magnification of 20. The test was done on 100 cells of each type. The test results are as shown in Table 1. The cylindrical alkaline-manganese dioxide cell Nos. 1 to 6 were constructed as will be described below.

The cylindrical alkaline-manganese dioxide cell Nos. 1 to 6 use gaskets, respectively, whose hob inside diameters were 80, 90, 74, 77, 93 and 96%, respectively, of the outside diameter of the current collector. Note that the gaskets used in the cell Nos. 1 to 6 had a same shape except for the hob inside diameters.

TABLE 1

| | Occurrences of leakage/cells | | | | | Occurrence of crack |
|---|---|---|---|---|---|---|
| | Storage at 75° C. and 50% RH | | | Storage at room temperature | | |
| | 40 days | 80 days | 120 days | One year | 2 years | |
| Cell No. 1 | 0 | 0 | 0 | 0 | 0 | No |
| Cell No. 2 | 0 | 0 | 0 | 0 | 0 | No |
| Cell No. 3 | 0 | 9 | 35 | 0 | 11 | Yes |
| Cell No. 4 | 0 | 0 | 5 | 0 | 0 | Yes |
| Cell No. 5 | 0 | 0 | 2 | 0 | 0 | No |
| Cell No. 6 | 0 | 0 | 24 | 0 | 3 | No |

As seen from Table 1, the cell Nos. 1 and 2 showed neither leakage not crack under all the conditions. However, the cell Nos. 3 to 6 showed a leakage, and cell Nos. 3 and 4 showed a crack. From the test results in Table 1, it is revealed that in the cylindrical alkaline-manganese dioxide cells, the hob inside diameter of the gasket should preferably be 80 to 90% of the outside diameter of the current collector.

Next, the cylindrical alkaline-manganese dioxide cell Nos. 1, 7 to 9 were tested for pressures under which the thin portions of the gaskets were torn. For measurement of the thin portion tearing pressure, a dedicated hydraulic measuring equipment was used to test 50 cells of each type. A mean value and a standard deviation, namely, variation of the tearing pressure, were calculated from the measured pressures under which the thin portions (safety valve) of the gaskets in the respective cells were torn. The results are shown in Table 2. The cell Nos. 7 to 9 thus tested were constructed as will be described below.

In the cell No. 7, the gasket thin portion was formed in a position nearer to the top of the diaphragm. In the cell No. 8, the gasket hob hole was formed straight to have a same diameter everywhere. In the cell No. 9, the inner circumferential side of the gasket thin portion was not chamfered.

TABLE 2

| | Pressure under which gasket thin portion was torn (kg/cm$^2$) | |
|---|---|---|
| | Mean value | Standard deviation |
| Cell No. 1 | 82 | 1.2 |
| Cell No. 7 | 80 | 2.3 |
| Cell No. 8 | 81 | 1.3 |
| Cell No. 9 | 77 | 8.7 |

As revealed from Table 2, the cell No. 1 shows a small standard deviation as compared with those of the cell Nos. 7 to 9. The test results shown in Table 2 reveal that in the cylindrical alkaline-manganese dioxide cells, the gaskets whose thin portion is formed in a position nearer to the bottom of the diaphragm portion and chamfered at the inner-circumferential side thereof and whose hob portion is gradually increased in thickness at the lower portion thereof, can be torn stably with less variation of the thin portion tearing pressure.

Further, the cell Nos. 1 and 10 having been stored under the predetermined conditions were tested for occurrence of leakage and crack by the aforementioned method. The test results are shown in Table 3. It should be noted that in the cell No. 10, the lower end of the gasket hob portion was not formed to project from the bottom of the diaphragm portion.

TABLE 3

| | Occurrences of leakage/cells | | | | | Occurrence of crack |
|---|---|---|---|---|---|---|
| | Storage at 75° C. and 50% RH | | | Storage at room temperature | | |
| | 40 days | 80 days | 120 days | One year | 2 years | |
| Cell No 1 | 0 | 0 | 0 | 0 | 0 | No |
| Cell No. 10 | 0 | 0 | 3 | 0 | 0 | No |

As seen from Table 3, the cell No. 1 showed no occurrence of leakage, while the cell No. 10 showed an occurrence of leakage. It is revealed from these test results that to surely prevent the leakage in the cylindrical alkaline-manganese dioxide cells, the lower end of the gasket hob portion should preferably be formed to project from the bottom of the diaphragm portion.

Finally, the cell Nos. 1 and 11 to 13 were tested for occurrence of a crack due to a shock given to the hob portion by the current collector being introduced into the hob hole. The gasket was dried at 100° C. for 24 hours, and a current collector having an outside diameter being 160% of the inside diameter of the hob portion was introduced into the hob hole of the gasket. The hob portion was observed for occurrence of a crack under a microscope with a magnification of 20. The current collector insertion as in the above was repeated with 500 cells of each type. Occurrences of crack were checked on each cell. The test results are as shown in Table 4. For the cell No. 1, a gasket was molded using the mold assembly having previously been described. For the cell No. 11, a gasket was molded using the mold assembly 19 in which the ejector sleeve and ejector pin were not provided. For the cell No. 12, a gasket was molded using a mold assembly provided with a pin point gate formed from the bottom of the hob portion. For the cell No. 13, a gasket was molded using a mold assembly provided with a side gate formed from the outer-circumferential side.

TABLE 4

| | Occurrences of crack/cells |
|---|---|
| Cell No. 1 | 0 |
| Cell No. 11 | 3 |
| Cell No. 12 | 27 |
| Cell No. 13 | 138 |

Table 4 reveals that no crack occurred in the cell No. 1 and the cell Nos. 11 to 13 showed the occurrences of crack. It can be judged from these test results that for the cylindrical alkaline-manganese dioxide cells, the gasket should preferably be molded using a mold assembly provided with a ring, disc or film gate formed from the top of the hob portion and with an ejector sleeve and ejector pin.

As having been described in the foregoing, the present invention provides a gasket having an excellent anti-cracking property, and a method of molding the gasket using a mold assembly in which a resin can be filled uniformly and sufficiently to mold a gasket with less voids, sinks or weld marks on the hob portion thereof. The voids, sinks and weld marks, if any, will deteriorate the strength of the gasket. The gasket thus molded will have no weld on the thin portion (safety valve) and nonuniform distribution of strength. In the gasket, the chamfering of the inner-circumferential side and edge-like forming of the outer-circumferential side will assure a stable tearing of the thin portion weaker than the inner-circumferential side. Therefore, the cylindrical alkaline-manganese cell using the gasket molded by the method according to the present invention is improved in leakage prevention since the cell can be sealed with the gasket excellent in cracking resistance and which works as a superior explosion safety valve to assure a stable tearing.

What is claimed is:

1. A gasket comprising:
   a cylindrical portion whose lower portion is gradually increased in thickness towards the lower end thereof, having formed therein a hole open at the top and bottom thereof, the lower opening being larger than the upper one, and in which a current collector is to be inserted;
   a disc-shaped portion formed contiguously along the outer circumference of and concentrically with the cylindrical portion;
   a thin portion formed between the cylindrical and disc-shaped portions, concentrically with the cylindrical portion and in a position nearer to the bottom of the disc-shaped portion; and
   a peripheral portion formed contiguously along the outer circumference of the disc-shaped portion to have the axial-sectional shape of a curve;
   the cylindrical portion being formed to project at the lower end thereof downward from the bottom of the disc-shaped portion;

the boundary between the cylindrical and thin portions being chamfered or curved; and the boundary between the disc-shaped and thin portion being formed like a generally vertical edge.

2. The gasket as set forth in claim 1, wherein the chamfered length C is 0.01 to 0.20 mm.

3. The gasket as set forth in claim 1, wherein the radius of curvature of the chamfering is 0.05 to 0.30 mm.

4. The gasket as set forth in claim 1, wherein the inside diameter of the cylindrical portion is 80 to 90% of the outside diameter of the current collector.

5. A method of molding a gasket using a mold assembly which comprises:

assembling a male and female mold, which when assembled define spaces into which a resin is filled to mold a gasket, said spaces comprising:

a cylindrical space;

a disc-shaped space positioned along the outer circumference of the cylindrical space;

a curved space contiguous to the outer circumference of the disc-shaped space; and a narrow space resulted from a projection formed on the male mold between the cylindrical and disc-shaped spaces, the projection being chamfered or curved at a side thereof facing the cylindrical space and directed downward in the direction of the female mold;

the male mold having formed therein an injection gate open at the top of the cylindrical space; and at least any one of an ejector sleeve formed on the female mold at the bottom of the cylindrical space and an ejector pin formed in the curved space, being provided for the resin to be filled uniformly into the mold assembly.

6. The method as set forth in claim 5, wherein the injection gate formed in the female mold of the mold assembly is a ring gate, disc gate or film gate.

7. A cylindrical alkaline-manganese dioxide cell including a can open at one towards the lower end thereof, the can opening being sealed with a gasket comprising:

a cylindrical portion whose lower portion is gradually increased in thickness towards the lower end thereof, having formed therein a hole open at the top and bottom thereof, the lower opening being larger than the upper one, and in which a current collector is to be inserted;

a disc-shaped portion formed contiguously along the outer circumference of and concentrically with the cylindrical portion;

a thin portion formed between the cylindrical and disc-shaped portions, concentrically with the cylindrical portion and in a position nearer to the bottom of the disc-shaped portion; and a peripheral portion formed contiguously along the outer circumference of the disc-shaped portion to have the axial-sectional shape of a curve;

the cylindrical portion being formed to project at the lower end thereof downward from the bottom of the disc-shaped portion;

the boundary between the cylindrical and thin portions being chamfered or curved; and the boundary between the disc-shaped and thin portions being formed like a generally vertical edge.

8. The cylindrical alkaline-manganese dioxide cell as set forth in claim 7, wherein the chamfered length C is 0.01 to 0.20 mm.

9. The cylindrical alkaline-manganese dioxide cell as set forth in claim 7, wherein the radius of curvature of the chamfering is 0.05 to 0.30 mm.

10. The cell of claim 7, wherein the inside diameter of the cylindrical portion is 80 to 90% of the outsider diameter of the current collector.

* * * * *